Patented Oct. 11, 1932

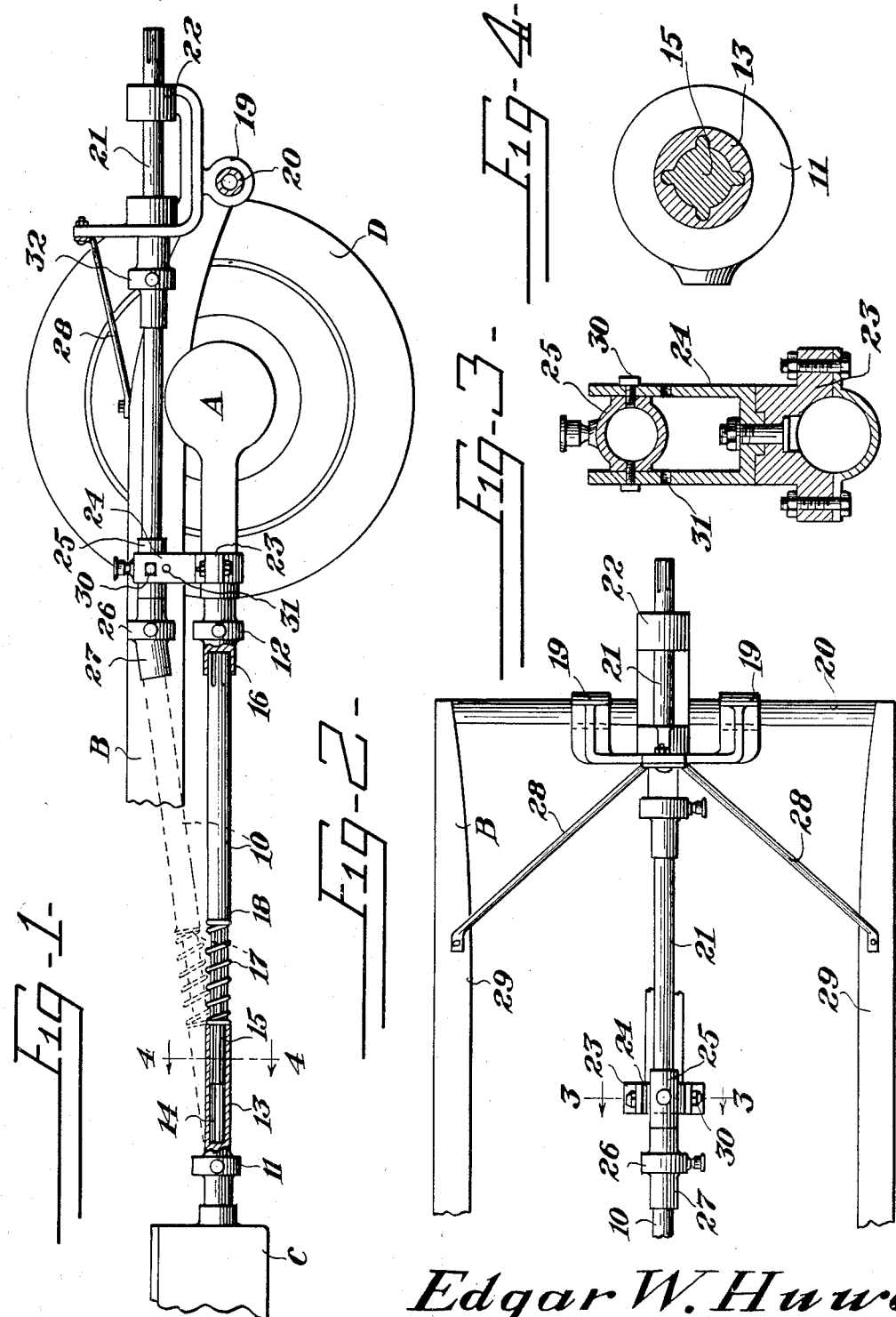

UNITED STATES PATENT OFFICE

EDGAR W. HUWE, OF NOONAN, NORTH DAKOTA

POWER TAKE-OFF FOR MOTOR DRIVEN VEHICLES

Application filed June 27, 1931. Serial No. 547,400.

The invention relates to a power take-off and more especially to a direct power take-off attachment for motor driven vehicles.

The primary object of the invention is the provision of an attachment of this character wherein the power from the motor vehicle engine can be carried direct to machinery for the operation of the same, such as sawing machines, cement mixers, grain cleaners, feed mills, silo fillers, corn shellers, well drilling machinery, portable grain elevators, hay and straw bailers and any machinery where a gear belt, chain or direct drive can be utilized.

Another object of the invention is the provision of an attachment of this character wherein the power shaft between the motor of the motor driven vehicle and the differential for the driving wheels of said vehicle can be conveniently coupled with the attachment, which is of novel form and supported by the chassis of the vehicle, so that direct power from the engine or motor of said vehicle can be transmitted to machinery for the operation thereof.

A further object of the invention is the provision of an attachment of this character, wherein the construction thereof is novel in form so that it can be readily and conveniently applied to a motor driven vehicle both to its rear housing and the rear end of its chassis and in this manner becomes a permanent equipment thereof, whereby the power shaft of the vehicle can be readily and conveniently utilized to effect a power-take-off from the vehicle.

A still further object of the invention is the provision of an attachment of this character which is extremely simple in construction, thoroughly reliable and efficient in purpose, readily and easily mounted upon and removed from a motor driven vehicle, strong, durable, and inexpensive to manufacture and install.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing:—

Figure 1 is a fragmentary vertical sectional elevation through a motor driven vehicle showing the power take-off attachment constructed in accordance with the invention applied thereto, portions of the power shaft of the vehicle being broken away to disclose details.

Figure 2 is a fragmentary bottom plan view of a portion of the chassis of the motor vehicle with the take-off attachment applied thereto.

Figure 3 is an enlarged sectional view on the line 3—3 of Figure 2 looking in the direction of the arrows.

Figure 4 is an enlarged sectional view on the line 4—4 of Figure 1 looking in the direction of the arrows.

Similar reference characters indicate corresponding parts throughout the several views in the drawing.

Referring to the drawing in detail, A designates the rear differential housing, B a portion of the rear of the chassis and C a part of the motor of a motor driven vehicle. Power from the motor of said vehicle is transmitted to the differential mechanism within the housing A through the power shaft 10 as usual and the coupling thereof with the engine drive shaft is had through the medium of fore and aft universal joints 11 and 12 respectively as usual. One fitting of the fore universal joint 11 is formed with an elongated socketed extension 13, the socket 14 therein being squared to slidably accommodate the reduced squared end 15 of the power shaft 10 for a purpose presently described.

The universal joint 12 has one of its members provided with a socketed nipple 16 in which is detachably splined the rear end of the power shaft 10, while surrounding the reduced squared end 15 of said power shaft is a coiled expansion spring 17, the latter playing against the free end of the extension 13 and the shoulder 18 next thereto of the shaft 10 so that the said spring 17 will function to hold the shaft 10 detachably splined with the nipple 16 of the rear universal joint 12 and in this condition power will be transmitted from the motor C to the differential within the housing A for driving each power wheel D of the motor driven vehicle.

The power take-off attachment comprises a bracket 19 permanently coupled with the cross member 20 at the rear end of the chassis B and within this bracket is supported a driven power shaft 21 in bearings 22 formed in said bracket, the shaft 21 being designed for connection with machinery to be driven direct from the power motor C of the motor driven vehicle.

Upon the housing A forwardly of the bracket 19 is a strap bearing 23 on which is pivoted a supporting yoke 24 carrying a bearing 25 through which is passed the forward end portion of the shaft 21 and attached to this forward end of the shaft 21 is a universal joint 26, the latter having a socketed nipple 27 correspondingly to the nipple 16 so that when the power shaft 10 is detached from the nipple 16 it can be detachably splined in the nipple 27 so that direct power from the motor C will be transmitted through said shaft 10 to the shaft 21 which when coupled with machinery will be driven thereby. It will be apparent that the power shaft 10 on disposing the same forwardly against the resistance of the spring 17 the squared reduced end portion 15 will slide in the extension 13 of the fore universal joint 11 whereby the rear end of said shaft 10 will become detached from the socketed nipple 16 of the aft universal joint 12 and on the swinging of said shaft 10 to the position shown by dotted lines in Figure 1 of the drawing the rear end of said shaft will detachably engage in the nipple 27 of the universal joint 26 of the take-off attachment and thus transferring the power from the motor C to each driving wheel D of the vehicle to the driven shaft 21 as should be clearly obvious.

The bracket 19 is held braced in its mounting upon the cross member 20 of the chassis B by forwardly divergent brace rods 28 made fast to said bracket and to the side sill 29 of the chassis B. The mounting of the take-off attachment as hereinbefore described enables it to become a permanent equipment of the motor driven vehicle.

The yoke 24 is constructed to permit the adjustment of the bearing 25 therein through the medium of the bolts 30, these being selectively engaged in the holes 31 in the side arms of the yoke 24, thus varying the disposition of the shaft 21 which is composed of two sections united through the medium of the universal joint therebetween.

What is claimed is:—

1. In a motor vehicle, the combination with an engine, differential gearing and a driving transmission shaft connected with the differential gearing, of a bracket adapted to be secured upon a chassis at its rear end of the motor vehicle, a supporting yoke forwardly of said bracket, a driven shaft journaled in said yoke and bracket and projected rearwardly beyond the vehicle, a slidable connection between the engine and said transmission shaft, means for tensioning said slidable connection, and universal joints associated with the transmission shaft and driven shaft for alternate separate connection of the transmission shaft with the driven shaft and said differential gearing.

2. In a motor vehicle, the combination with an engine, differential gearing and a driving transmission shaft connected with the differential gearing, of a bracket adapted to be secured upon a chassis at its rear end of the motor vehicle, a supporting yoke forwardly of said bracket, a driven shaft journaled in said yoke and bracket and projected rearwardly beyond the vehicle, a slidable connection between the engine and said transmission shaft, means for tensioning said slidable connection, universal joints associated with the transmission shaft and driven shaft for alternate separate connection of the transmission shaft with the driven shaft and said differential gearing, and lateral and vertically swinging bearings arranged in said yoke.

In testimony whereof I affix my signature.

EDGAR W. HUWE.